(12) United States Patent
Weir (10) Patent No.: US 8,698,352 B2
(45) Date of Patent: Apr. 15, 2014

(54) RAPID ACTIVATION FUSIBLE LINK

(75) Inventor: Richard D. Weir, Cedar Park, TX (US)

(73) Assignee: EEStor, Inc., Cedar Park, TX (US)

( * ) Notice: Subject to any disclaimer, the term of this patent is extended or adjusted under 35 U.S.C. 154(b) by 648 days.

(21) Appl. No.: 12/860,519

(22) Filed: Aug. 20, 2010

(65) Prior Publication Data

US 2011/0043036 A1 Feb. 24, 2011

Related U.S. Application Data

(60) Provisional application No. 61/235,458, filed on Aug. 20, 2009.

(51) Int. Cl.
*H02J 1/10* (2006.01)
(52) U.S. Cl.
USPC .............. 307/43; 307/147; 307/149; 429/61; 429/62; 429/160; 429/161; 429/304; 361/311; 361/324
(58) Field of Classification Search
USPC .......................................................... 307/43
See application file for complete search history.

(56) References Cited

U.S. PATENT DOCUMENTS

| | | | |
|---|---|---|---|
| 4,671,618 A | 6/1987 | Wu et al. | |
| 4,834,952 A | 5/1989 | Rollat et al. | |
| 5,017,446 A | 5/1991 | Reichman et al. | |
| 5,045,170 A | 9/1991 | Bullock et al. | |
| 5,177,674 A * | 1/1993 | Sugisaki | 361/534 |
| 5,340,510 A | 8/1994 | Bowen | |
| 5,808,351 A | 9/1998 | Nathan et al. | |
| 5,929,259 A | 7/1999 | Lockemeyer | |
| 6,452,776 B1 * | 9/2002 | Chakravorty | 361/303 |
| 7,068,898 B2 | 6/2006 | Buretea et al. | |
| 7,237,634 B2 | 7/2007 | Severinsky et al. | |
| 7,466,536 B1 | 12/2008 | Weir et al. | |
| 2001/0010367 A1 | 8/2001 | Burnell-Jones | |
| 2004/0071944 A1 | 4/2004 | Weir et al. | |
| 2005/0233210 A1 * | 10/2005 | Horie et al. | 429/161 |
| 2007/0188147 A1 * | 8/2007 | Straubel et al. | 320/134 |
| 2010/0092861 A1 * | 4/2010 | Kim | 429/178 |
| 2010/0124693 A1 * | 5/2010 | Kosugi et al. | 429/92 |
| 2010/0291426 A1 * | 11/2010 | Zhou | 429/99 |

FOREIGN PATENT DOCUMENTS

| | | |
|---|---|---|
| CA | 02598787 | 3/2008 |
| CA | 02598754 | 4/2008 |
| JP | 55154321 | 12/1980 |
| JP | 10-199751 A | 7/1998 |
| JP | 11147716 | 6/1999 |
| JP | 2003192343 | 7/2003 |

(Continued)

OTHER PUBLICATIONS

F. Sears et al., "Capacitance—Properties of Dielectrics", University of Physics, Addison Wesley Publishing Company, Inc., Feb. 1984, pp. 516-533.

(Continued)

*Primary Examiner* — Rexford Barnie
*Assistant Examiner* — Toan Vu
(74) *Attorney, Agent, or Firm* — Abel Law Group, LLP (57) ABSTRACT

An assembly includes a plurality of energy storage components. An energy storage component is electrically coupled to at least two other energy storage components of the plurality by at least two electrical pathways, each including a fusible link. The at least two electrical pathways may be formed in a circuit board. The energy storage component may be coupled to the circuit board by a fusible link.

26 Claims, 4 Drawing Sheets

(56) References Cited

FOREIGN PATENT DOCUMENTS

| WO | 9316012 | | 8/1993 |
|----|---------|----|--------|
| WO | 2005039256 | A1 | 4/2005 |
| WO | 2008031189 | A1 | 3/2008 |
| WO | 2008031189 | B1 | 3/2008 |
| WO | 2008040114 | A1 | 4/2008 |

OTHER PUBLICATIONS

J. Kuwata et al., "Electrical Properties of Perovskite-Type Oxide Thin-Films Prepared by RF Sputtering", Jpn J. Appl. Phys., Part 1, 1985, 413-15.

Bruno et al., "High-Performance Multilayer Capacitor Dielectrics from Chemically Prepared Powders", Journal of the American Ceramic Society, vol. 76, No. 5, pp. 1233-1241, 1993.

Mitsubishi Polyester Film Corporation specification sheet for Hostaphan (R) RE film for capacitors, Copyright 2007.

Beheir et al., "Studies on the liquid-liquid extraction and ion and precipitate flotation of Co(II) with decanoic acid", Journal of Radioanalytical and Nuclear Chemistry, Articles, vol. 174m, No. 1 (1992) 13-22.

International Search Report and Written Opinion mailed Apr. 19, 2011 from International Application No. PCT/US2010/046166 filed Aug. 20, 2010.

* cited by examiner

RAPID ACTIVATION FUSIBLE LINK

CROSS-REFERENCE TO RELATED APPLICATION(S)

The present application claims priority from U.S. Provisional Patent Application No. 61/235,458, filed Aug. 20, 2009, entitled "RAPID ACTIVATION FUSIBLE LINK," naming inventor Richard D. Weir, which application is incorporated by reference herein in its entirety.

FIELD OF THE DISCLOSURE

This disclosure, in general, relates to fusible links for use in energy storage units and associated circuitry.

BACKGROUND

In electronics and electrical engineering a fuse (short for fusible link), is a type of overcurrent protection device, generally formed of a metal wire or strip that melts when too much current flows, which breaks the circuit in which it is connected, thus protecting the circuit's other components from damage due to excessive current.

A practical fuse was one of the features of Thomas Edison's electrical power distribution system. An early fuse was said to have successfully protected an Edison installation from tampering by a rival gas-lighting concern.

Fuses (and other overcurrent devices) are a part of a conventional power distribution system to prevent fire or damage. When too much current flows through a wire, it may overheat and be damaged or even start a fire. Wiring regulations give the maximum rating of a fuse for protection of a particular circuit. Local authorities incorporate national wiring regulations as part of law. Fuses are selected to allow passage of normal currents, but to quickly interrupt a short circuit or overload condition.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DESCRIPTION OF THE PREFERRED EMBODIMENT(S)

In an exemplary embodiment, an electrical energy storage unit (EESU) includes a plurality of energy storage devices. An electrode of an energy storage device, such as a capacitive storage device, is connected through at least two electrical pathways to electrodes of at least two other energy storage devices. The at least two electrical pathways each include a fusible link, for example, in series, between the electrodes. In an example, the electrical pathways may be formed in a circuit board and the electrode may be electrically connected to the circuit board through another fusible link. In a further example, the electrodes may be anodes. Alternatively, the electrodes may be cathodes. In an additional embodiment, a circuit board including fusible links may be used to electrically connect each of a plurality of cathodes of energy storage devices, and a circuit board including fusible links may be used to electrically connect each of a plurality of anodes of the energy storage devices. The circuit boards may be electrically connected to terminals through an additional fusible link. In addition, the electrical energy storage unit (EESU) can include a housing isolated from at least one of the terminals. The housing may be electrically connected to ground.

Figure 1A:
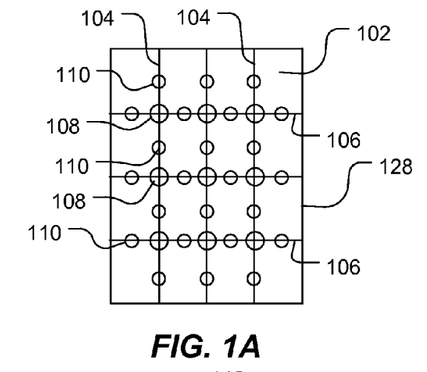
FIG. 1A, FIG. 1B, FIG. 1C, and FIG. 1D includes illustrations of aspects of a portion of an electrical energy storage unit (EESU).

In a particular embodiment, an array of fusible links can be formed in a circuit board that is coupled to electrodes of a set of energy storage devices. For example, conductors, such as fuse wires 104 and 106, can be embedded into a circuit board 102 with a layout as illustrated in FIG. 1A. As further illustrated in FIG. 1D, the fuse wires 104 and 106 can be positioned one over the other with separation to prevent direct contact. Alternatively, the fuse wires can be in contact at the crossover points.

The illustrated wire crosshatch design allows for circuit board vias, such as vias 108 or 110, to be used for multiple purposes. The connection vias 108 can be used to attach the top or bottom end caps or electrodes 116 or 118 in separate operations to the circuit boards 102. For example, the vias 108 may allow solder 112, such as a tin/silver solder, to flow through the vias 108 during a flow soldering procedure to connect to end caps 116 or 118 of the energy storage devices 114. Alternatively, a fusible material can be applied through the vias 108 to couple the conductors, e.g., fuse wires 104 and 106, to the electrodes 116 or 118 of the energy storage devices 114, forming a further fusible link.

In an example, the open vias 110 can expose the conductors, such as fusible wires 104 and 106, to air or an insulator material so that the conductor is not heat sinked to any material, allowing for a quicker activation time. Such vias 110 can be masked during the flow soldering steps. In a particular example, the thus formed fusible link 126 can be activated in the microsecond range, is ultra small, and can be used in multiple applications. For example, the conductor can be a tin-silver wire with 96.5 wt % tin and 3.5 wt % silver that can have diameters from 0.010 inch to 0.050 inch or larger. For example, the diameters can be in a range of 0.010 inch to 0.1 inch, such as 0.01 inch to 0.05 inch, a range of 0.01 inch to 0.03 inch, or a range of 0.01 inch to 0.02 inch. In particular, the material and diameter may be selected to provide a limit to current that may flow along the electrical pathway in which the fuse is disposed.

Figure 1B:
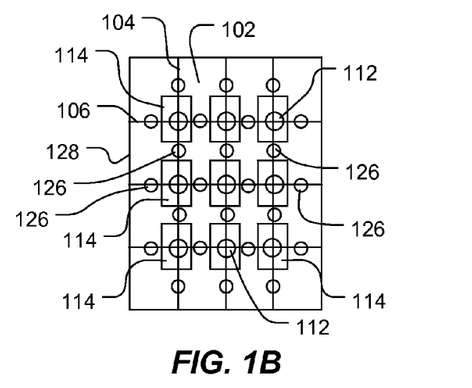

As illustrated in FIG. 1B, energy storage devices 114 are electrically connected to the circuit board 102 and conductors, such as fuse wires 104 and 106, through vias 108, such as with a conductive material, e.g., solder. In addition, energy storage devices 114 are electrically connected to adjacent energy storage devices 114 through fusible links 126. The fusible links 126 are electrically connected, for example, in series, between electrodes of adjacent energy storage devices 114. Optionally, a conductor 128 can be included that does not include a fusible link.

Figure 7:
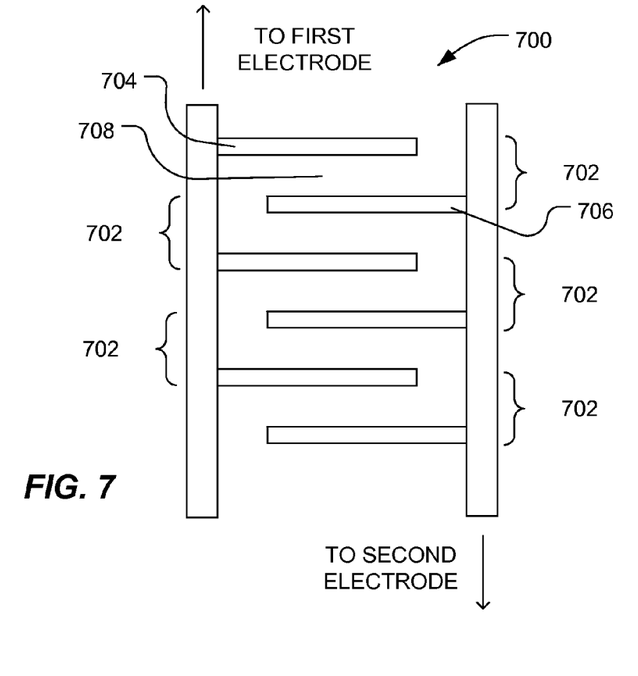
FIG. 7 includes an illustration of a portion of an exemplary energy storage device.

In a particular example, each of the energy storage devices 114 includes two electrodes 116 and 118 connected to a plurality of capacitive elements. As illustrated in FIG. 7, the energy storage device 700 can a set of capacitive elements 702 formed from a first set of conductive regions 704 and a second set of conductive regions 706 separated by a dielectric material 708. An exemplary dielectric material includes compositionally modified barium titanate powder dispersed in a vitreous or polymer matrix. The first set of conductive regions 704 can be connected to a first electrode of the energy storage device 700 and the second sect of conductive regions 706 can be connected to a second electrode of the energy storage device 700.

Figure 1C:
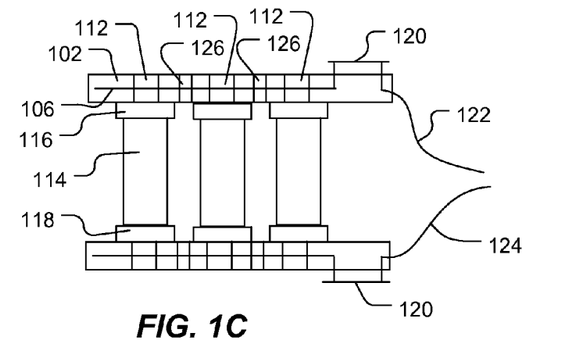
Figure 1D:
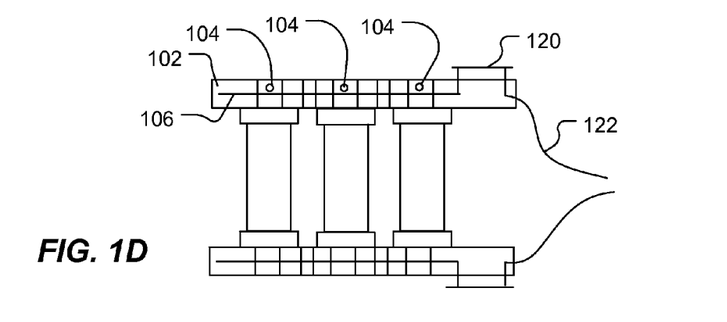

In addition, the electrodes 116 or 118 of the energy storage devices 114 are electrically connected to a terminal 122 or 124 of the electrical energy storage unit, as illustrated in FIG. 1C. Optionally, a further fusible link, such as fusible link 120, can be associated with the terminal 122 or 124 and can be electrically connected, for example, in series, between one or more of the electrodes 116 or 118 of the energy storage devices 114 and the terminal 122 or 124.

Figure 6:
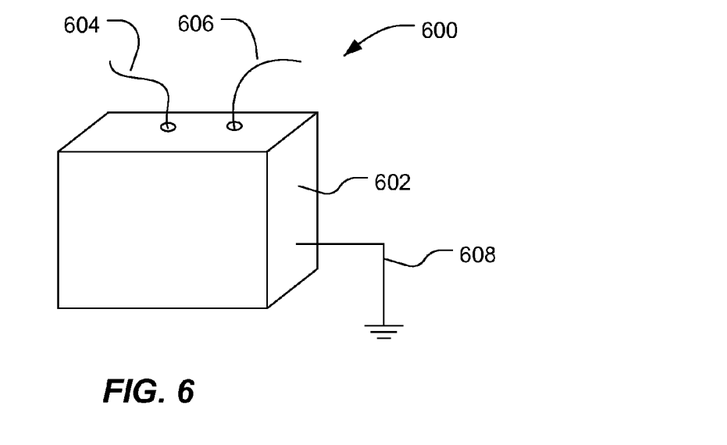
FIG. 6 includes an illustration of an exemplary electrical energy storage unit (EESU).

As illustrated in FIG. 6, the electrical energy storage unit 600 can further include a housing 602 separating the energy storage devices from the outside environment. The housing can be at least partially conductive, such as having a surface resistance of not greater than $10^5$ ohms, such as not greater than $10^4$ ohms, not greater than $10^3$ ohms, or not greater than $10^2$ ohms. The terminals 604 or 606 can extend through the housing 602. At least one of the terminals 604 or 606 is electrically isolated from the housing 602. Optionally, the housing 602 can be electrically connected to ground 608. One of the terminals 604 or 606 can optionally be electrically connected to ground.

In an example, electrical energy storage units (EESU) are contained within a housing, such as a metal box, which is connected to ground. The metal box is isolated from the array of energy storage devices, for example, by multiple rubber insulator layers. During an accident, for example, a conductive probe or debris can penetrate the metal box and while touching the metal box short out anodes of the component matrix. Such a situation may arise in an accident in which metal debris penetrates the box in which the energy storage devices are contained. In such a case, one or more electrodes may be electrically connected to ground. As a result, one or more fusible links may break to limit discharge from the other energy storage devices. In addition, less than the total number of storage devices may discharge and at least a portion of the units may be operational despite the penetration.

Figure 2A:
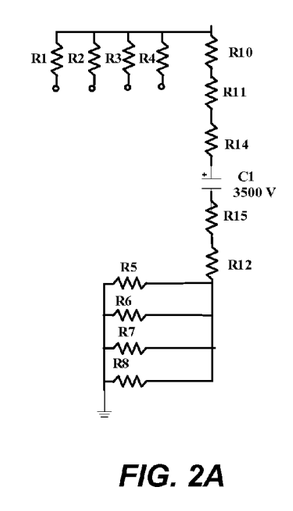
FIG. 2A, FIG. 2B, and FIG. 2C include illustrations of the equivalent circuits of the portion of the electrical energy storage unit (EESU) before and after the shorting of one of the components.
Figure 2B:
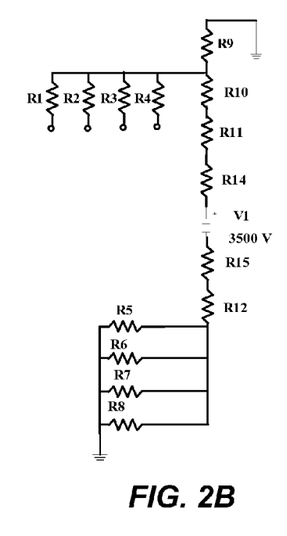
Figure 2C:
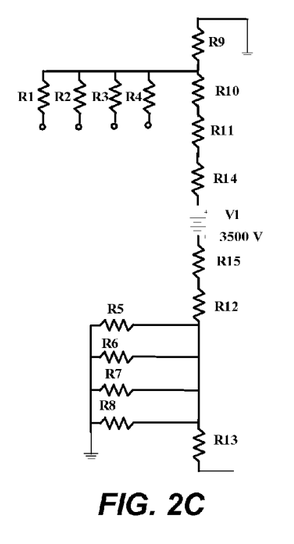

For example, FIG. 1 indicates an EESU that contains nine (9) components. FIG. 2 indicates equivalent circuit resistances that indicate the components before being shorted (FIG. 2A), after a metal probe is inserted into the EESU shorting out a component anode (FIG. 2B), and after two shorting probes touch both the top electrode and the bottom electrode (FIG. 2C). However, the melting current may be adjusted depending on the specifications for the particular system.

As illustrated in the exemplary first circuit (FIG. 2A), neither the anode nor cathode is electrically connected to ground. In the second exemplary circuit (FIG. 2B), a probe, represented by R9, acts to connect an electrode to ground. In such a case, the fusible links, such as represented by R1, R2, R3, and R4, can break to limit current flow from storage devices that are not compromised by the probe. Further, a fusible link, represented as R10 may break to limit discharge from the compromised storage device.

In an exemplary third circuit (FIG. 2C), probes represented by R9 and R13 electrically connect both the cathode and anode to ground. In such a case, fusible links, such as represented by R1, R2, R3, R4, R5, R6, R7, and R8, can break to limit flow from other storage devices, and fusible links R10 and R12 can break to limit discharge from the compromised storage device.

In a particular example, if the compromised device is the center device of the system illustrated in FIG. 1, the center device is electrically isolated from the other devices. The other devices remain electrically connected to each other and can function to provide energy through the terminals, despite the lost connectivity with the center device.

In the illustrated example, such fusible links are not replaceable, but such a system and method of fusing a component can be used in applications where catastrophic failure can occur but the fusible links isolate the failure and allows the possibility for operation to continue or a controlled shutdown to occur. To repair the illustrated system, such as system may be returned to the factory. Alternatively, field repairable units can be envisaged.

To form the energy storage unit, an array of energy storage devices can be arranged and aligned with vias of a circuit board. The energy storage devices can be electrically connected to the circuit board through the vias. For example, conductors in the circuit board can be soldered to the electrode of the energy storage device. In a particular example, a flow solder technique, such as a wave solder technique, can be used. The process can be repeated with a second circuit board to electrically connect the second circuit board to a second electrode of the energy storage devices. The circuit boards can be connected to different terminals and the assembly can be placed in a conductive housing. Electrically insulative material can be used to isolate the energy storage devices from the conductive housing. Optionally, the housing can be electrically connected to ground.

EXAMPLES

As illustrated in FIG. 1B, a circuit board can include nine (9) components wave soldered to circuit boards. Such a fusible link assembly is the energy storage assembly of the electrical energy storage unit (EESU). Assemblies can contain many thousands of components when the application requires more energy storage. The energy storage assembly and the converter and charger circuits can be packaged into a metal box. If the metal box, which is connected to ground, is penetrated by a conductive probe and touches the anode of one of the devices, as indicted in the exemplary circuit of FIG. 2B, such an occurrence can blow both the anode fuses and the cathode fuses, which when blown isolate that component. If both the anode and cathode are shorted, as indicated in the exemplary circuit of FIG. 2C, both filled anode and cathode via fusible links can blow. Accordingly, the other EESU stored energy is not discharged instantaneously, preventing a potentially dangerous electrical arc.

For example, when a metal probe penetrates the metal box and touches the anode of any of the components electrical current rapidly rises though the metal probe. When capacitors are shorted the capacitance becomes zero and if the capacitors have been charged, the equivalent circuit indicates the capacitor as a voltage source as indicated in the exemplary circuits of FIGS. 2B and 2C. As the shorting current increases across the resistive links of the equivalent circuit, the link with the highest resistance and the lowest melting temperature melts first and sets up an open condition in that section of the equivalent circuit.

In an exemplary embodiment used in the examples below, the following indicates the fusing current for the links and components in the current path of a short illustrated in FIG. 2B or 2C:

| | |
|---|---|
| Fusible link wires | 1.65 A |
| Filled via holes fusible link | 9.36 A |
| Steel probe | 282 A |
| Copper end caps | 2381 A |
| Silver filled epoxy | 243 A |
| Aluminum electrodes (1000 in parallel) | 5320 A |

When a short occurs, the fusible link wires melt first. Subsequently, the filled via hole fusible link melts. The other components remain intact. The component fusible links connecting components to each other that are around the shorted component remain intact due to the fact that the shorting current is reduced by a factor of nine (9). Components that are next to these components have the shorting current reduced by a factor of 27 and so on out from the shorted device.

As an example, the length of the open via to assist in eliminating arcing after the fusible link is melted can be determined by using Paschen law indicated below.

$V=24.2[293pd/760T]+6.08[293pd/760T]^{1/2}$ @ 706 torr and 22.2° C. is the formula for the breakdown.

In the example, the equation yields a value of 30 kV/cm for the air breakdown under these conditions. At 80° C., the value is reduced to 7500V/cm and at 3500V the required distance is 0.184 inches. For additional safety margin, 0.2 inches for the length of the open via wire fusible link may be used in the example.

The time to blow the links is indicated by the following formula called Onderdonk's equation:

$$I = A \cdot \{\log[1+(T_m-T_a)/(234+T_a)]/33 \cdot S\}^{1/2}$$

Where:
I=current in amps (A)
A=cross sectional area in circular mils
$T_m$=melting temperature of the material in ° C.
$T_a$=ambient temperature in ° C.
S=time in seconds
Solving for Time (S):

$$S = A^2 \cdot \log\{[1+(T_m-T_a)/(234+T_a)]/33 \cdot I^2\}$$

Accordingly, fusing time S is rapidly reduced by increasing the current. The fusing times illustrated in the FIG. 4 and FIG. 5 indicate the high currents created by the 3500 V and the extremely low link resistances.

Analysis and Test Data Information

It is desirable to have the highest resistance, lowest melting point, and smallest volume fusible links melt first and create an open circuit between the short and the component.

Fusible Links:

In the illustrated example, the fusible links are 0.010 inch diameter tin (96.5 wt %) and silver (3.5 wt %) wire. Each component has four wire fusible links attached to both the top and bottom electrodes where the length of each link is 0.20 inches. The electrodes also have two tin/silver fusible plates through circuit board holes for both the top and bottom electrodes which can be activate by shorting both the top and bottom electrodes.

Figure 3:
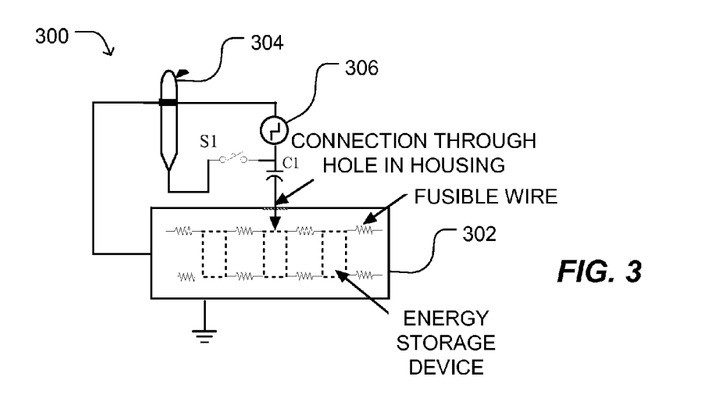
FIG. 3 includes an illustration of an apparatus to test fusing time.

The melting current of the wire link is:
Fusing Currents of Wires:
$I=Kd^{3/2}$
K is a constant that depends on the metal concerned
K=1642 for tin
d=diameters in inches=0.01"
$I_{melt}$=1.64 A
d=diameter of plated through circuit board via hole=0.032"
$I_{melt}$=9.36 A
Aluminum Electrode
Fusing Currents of Electrodes:
$I=Kd^{3/2}$
K is a constant that depends on the metal concerned
K=7585 for aluminum
d=diameters in inches (equivalent)=$7.98 \times 10^{-3}$ inches
$I_{melt}$=5.32 A In the exemplary embodiment, each component may have as many as 1000 electrodes in parallel. Such electrodes do not melt under the fusing conditions.
Total Current to Melt all Electrodes
$I_{total}$=5320 A
Shorting Probe
For this shorting example the shorting probe is steel with a diameter of 0.2 inches.
$I=Kd^{3/2}$
K is a constant that depends on the metal concerned
K=3148 for steel
d=diameters in inches=0.2"
$I_{melt}$=282 A
Copper End Caps or Electrodes
$I=Kd^{3/2}$
K is a constant that depends on the metal concerned
K=10,244 for copper
d=diameters in inches (equivalent)=0.378"
$I_{melt}$=2381 A
Silver-Filled Epoxy
$I=Kd^{3/2}$
K is a constant that depends on the metal concerned
K=1046 for silver-filled epoxy (estimate)
d=diameters in inches (equivalent)=0.378"
$I_{melt}$=243 A Using the apparatus 300 illustrated in FIG. 3, testing is performed by connecting a metal probe 304 between an electrode of a device of the energy storage unit 302 and the grounded housing of the energy storage unit 302. For example, the energy storage devices are charged to 3500 V. The oscilloscope 306 is triggered on the close of S1. S1 is closed resulting in current flow from the electrode of the device through the metal probe and to the housing. The known resistance of the probe permits determination of the current based on the oscilloscope readings. The ride times and current amplitudes on the oscilloscope are recorded. Overshoot of the current from the fusible wire link fusing currents is caused by the time to heat the wires to their melting condition.

Example 1

R9 Shorts Out Top Electrode (Anode)

The current through R9 includes the summation of the current through R1-R4. If the current through each of R1-R4 is equal to or greater than 6.56 A, then fusing occurs and this current source is terminated. If the cathode is connected to ground, the current in R5-R8 increases until 6.56 A is reached, then fusing occurs and the current is terminated.

Other fusing currents are higher than the 6.56 A to blow the fusible links therefore the fusing current in these links is not achieved.

The fusing current in Example 1 reached 14.4 A. The Onderdonk equations indicate that, as the speed and amplitude of the fusing current increases, the fusing times can be significantly reduced. The reason for the increased fusing current can be explained by the rapid rise in wire temperature, increasing the apparent K of the tin/silver material, which in turn increases the fusing current.

Figure 4:
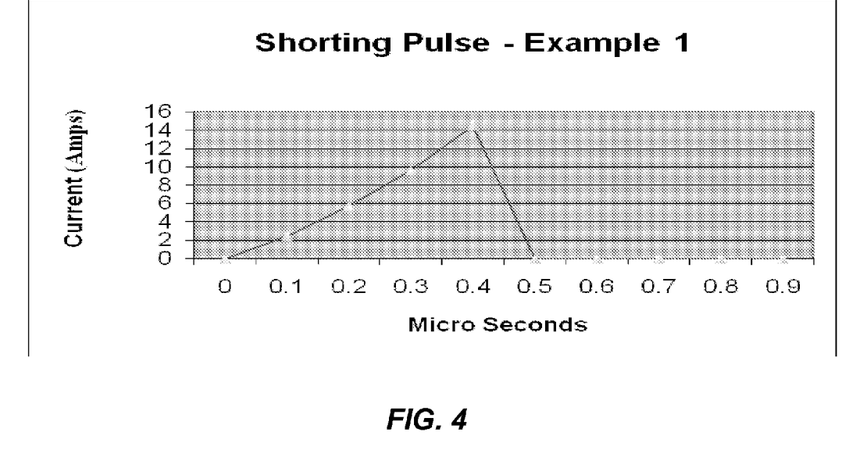
FIG. 4 includes a graph indicating the pulse shape of a shorting current for Example 1.

Once the fusible links fuse, the device is isolated and the fusing process for this short is completed. At the initial shorting, the device's capacitance acts as a short. The rise time of the shorting current is only limited by the circuit resistance, capacitance, and inductance. The circuit resistance is approximately $1.2 \times 10^{-3}$ ohms and the capacitance is approximately $1 \times 10^{-12}$ F. The time constant indicates rise times in the sub-picosecond range. The test data illustrated in FIG. 4 illustrates a rise time of 0.4 microseconds for Example 1. The fusing current as illustrated in FIG. 4 reaches 14.4 A.

Example 2

R9 and R13 Short Out the Top and Bottom Electrodes (Anode and Cathode)

The current through R9 includes a summation of the current through R1-R4. If the current through R1-R4 is equal to 6.56 A, then fusing occurs and this current source is terminated. If the current in R5-R8 increases until 6.56 A is reached then fusing occurs and this current is terminated. If the shorting current reaches 9.36 A the circuit board's via fusible links (e.g., R10 or R12) are blown. Other fusing currents are higher than the 9.36 A to blow the fusible links. Therefore, the fusing current in these links is not achieved.

The fusing current in Example 2 reaches 34.2 A. The Onderdonk equations indicate that, as the speed and amplitude of the fusing current increases, the fusing times can be significantly reduced. The reason for the increased fusing current can be explained by the rapid rise in wire temperature, increasing the apparent K of the tin/silver material, which in turn increases the fusing current.

Figure 5:
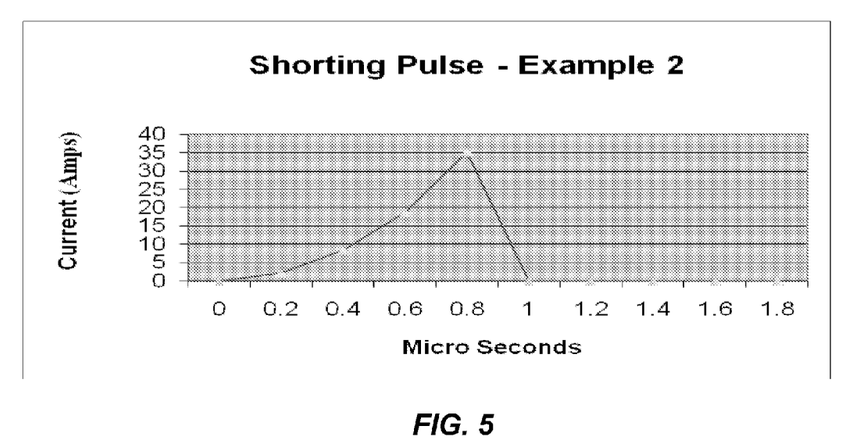
FIG. 5 includes a graph indicating the pulse shape of a shorting current for Example 2.

Once the fusible links are fused, the device is isolated and the fusing process for this short is completed. At the initial shorting, the device capacitance acts as a short. The rise time of the shorting current is only limited by the circuit resistance, capacitance, and inductance. The circuit resistance is approximately $1.2 \times 10^{-3}$ ohms and the capacitance is approximately $1 \times 10^{-12}$ F. The time constant indicates rise times in the sub-picosecond range. The test data illustrated in FIG. 5 shows a rise time of 0.8 microseconds for Example 2. The fusing current, as illustrated in FIG. 5, reaches 34.2 A.

In a first embodiment, an energy storage unit includes first and second terminals of opposite charge. The energy storage unit also includes first, second, and third energy storage devices. Each energy storage device includes first and second electrodes of opposite charge. The energy storage unit further includes a first fusible link electrically connected, for example, in series, between the first electrode of the first energy storage device and the first terminal. The first electrode of the second energy storage device is electrically connected between the first fusible link and the first terminal. The energy storage unit also includes a second fusible link electrically connected, for example, in series, between the first electrode of the first energy storage device and the first terminal. The first electrode of the third energy storage device is electrically connected between the second fusible link and the first terminal.

In an example of the first embodiment, the energy storage unit further includes a fourth energy storage device and a third fusible link electrically connected, for example, in series, between the first electrode of the first energy storage device and the first terminal. The first electrode of the fourth energy storage device is electrically connected between the third fusible link and the first terminal. The energy storage unit can further include a fifth energy storage device and a fourth fusible link electrically connected, for example, in series, between the first electrode of the first energy storage device and the first terminal. The first electrode of the fifth energy storage device is electrically connected between the fourth fusible link and the first terminal.

In another example of the first embodiment, the energy storage unit further includes a third fusible link electrically connected, for example, in series, between the second electrode of the first energy storage device and the second terminal. The second electrode of the second energy storage device is electrically connected between the third fusible link and the second terminal. The energy storage unit can further include a fourth fusible link electrically connected, for example, in series, between the second electrode of the first energy storage device and the second terminal. The second electrode of the third energy storage device is electrically connected between the fourth fusible link and the second terminal.

In a further example of the first embodiment, the energy storage unit further includes a conductive housing electrically isolated from at least one of the first or second terminals. The conductive housing can be grounded.

In an additional example of the first embodiment, the energy storage unit further includes a first terminal fusible link electrically connected, for example, in series, between the first terminal and the first electrode of the second energy storage device and electrically connected, for example, in series, between the first terminal and the first electrode of the third energy storage device.

In an example of the first embodiment, the energy storage unit further includes a circuit board including a first via, a second via, and a third via, a first conductor, and a second conductor. The first and second conductors are electrically connected to the first electrode of the first energy storage device through the first via. The first conductor is exposed at the second via to form the first fusible link. In an example the second conductor is exposed at the third via to form the second fusible link. In an alternative example, the first conductor is exposed at the third via to form the second fusible link. In another example, the first conductor includes a fusible wire. The fusible wire can have a diameter in a range of 0.01 inch to 0.1 inch. In a further example, the second conductor includes a fusible wire. The fusible wire can have a diameter in a range of 0.01 inch to 0.1 inch.

In another example of the first embodiment, each of the energy storage devices includes a plurality of capacitive elements electrically coupled to the first and second electrodes. In an additional example, each capacitive element of the plurality of capacitive elements includes two conductive regions of opposite charge separated by a dielectric material.

In a further example, the energy storage unit further includes a third fusible link electrically connected, for example, in series, between the first electrode of the first energy storage device and the first and second fusible links.

In an additional example of the first embodiment, the energy storage unit further includes a fourth energy storage device and a third fusible link electrically connected, for example, in series, between a first electrode of the fourth energy storage device and the first electrode of the second energy storage device. The energy storage unit can include a fourth fusible link electrically connected, for example, in series, between the first electrode of the fourth energy storage device and the first electrode of the third energy storage device.

In a second embodiment, an energy storage unit includes first and second terminals of opposite charge and first, second, third, and fourth energy storage devices. Each energy storage device includes first and second electrodes of opposite charge. The energy storage unit further includes a conductive housing electrically isolated from the first terminal. A first fusible link is electrically connected, for example, in series, between the first electrode of the first energy storage device and the first terminal. The first electrode of the second energy storage device is electrically connected between the first fusible link and the first terminal. A second fusible link is electrically connected, for example, in series, between the first electrode of the first energy storage device and the first terminal. The first electrode of the third energy storage device is electrically connected between the second fusible link and the first terminal. A third fusible link is electrically connected, for example, in series, between the first electrode of the first energy storage device and the first terminal. The first electrode of the fourth energy storage device is electrically connected between the third fusible link and the first terminal. A fourth fusible link is electrically connected, for example, in series, between the second electrode of the first energy storage device and the second terminal. The second electrode of the second energy storage device is electrically connected between the fourth fusible link and the second terminal. A fifth fusible link is electrically connected, for example, in series, between the second electrode of the first energy storage device and the second terminal. The second electrode of the third energy storage device is electrically connected between the fifth fusible link and the second terminal. A sixth fusible link is electrically connected, for example, in series, between the second electrode of the first energy storage device and the second terminal. The second electrode of the fourth energy storage device is electrically connected between the sixth fusible link and the second terminal.

In an example of the second embodiment, the conductive housing is grounded. In another example of the second embodiment, the energy storage unit further includes a first terminal fusible link electrically connected to the first electrode of the second energy storage device, electrically connected to the first electrode of the third energy storage device, and electrically connected to the first electrode of the fourth energy storage device.

In an additional example of the second embodiment, each of the energy storage devices includes a plurality of capacitive elements electrically coupled to the first and second electrodes. Each capacitive element of the plurality of capacitive elements can include two conductive regions of opposite charge separated by a dielectric material.

In a further example, the energy storage unit further includes a seventh fusible link electrically connected, for example, in series, between the first electrode of the first energy storage device and the first, second, and third fusible links.

In an example of the second embodiment, the energy storage further includes a fifth energy storage device and a seventh fusible link electrically connected, for example, in series, between a first electrode of the fifth energy storage device and the first electrode of the second energy storage device. The energy storage unit further includes an eighth fusible link electrically connected, for example, in series, between the first electrode of the fifth energy storage device and the first electrode of the third energy storage device.

In a third embodiment, an energy storage unit includes first and second terminals of opposite charge and first, second, third, and fourth energy storage devices. Each energy storage device includes first and second electrodes of opposite charge. The energy storage unit further includes a first fusible link electrically coupled, for example, in series, between the first electrode of the first energy storage device and the first electrode of the second energy storage device. A second fusible link is electrically coupled, for example, in series, between the first electrode of the second energy storage device and the first electrode of the third energy storage device. A third fusible link is electrically coupled, for example, in series, between the first electrode of the third energy storage device and the first electrode of the fourth energy storage device. A fourth fusible link is electrically coupled, for example, in series, between the first electrode of the fourth energy storage device and the first electrode of the first energy storage device. The first electrodes of the second, third, and fourth energy storage devices are electrically connected to the first terminal.

In an example of the third embodiment, the energy storage unit further includes a housing electrically isolated from at least one of the first or second terminals. The housing can be electrically grounded.

In another example of the third embodiment, the first electrodes of the second, third, and fourth energy storage devices are electrically connected to the first terminal by first, second, and third conductive paths, respectively, that are different from each other.

In a further example of the third embodiment, the first, second, and third conductive paths do not include the first, second, third, or fourth fusible links.

In a fourth embodiment, an energy storage unit includes first and second terminals of opposite charge and first, second and third energy storage devices. Each energy storage device of the first, second, and third energy storage devices includes a plurality of capacitive elements electrically connected to first and second electrodes of opposite charge. The energy storage unit also includes first and second fusible links. The first fusible link is electrically connected between the first electrode of the first energy storage device and the first electrode of the second storage device. The first electrode of the second storage device is electrically connected to the first terminal by a first path not including the first or second fusible links. The second fusible link is electrically connected between the first electrode of the first energy storage device and the first electrode of the third storage device. The first electrode of the third energy storage device is electrically connected to the first terminal by a second path not including the first or second fusible links and different from the first path.

In an example of the fourth embodiment, the energy storage unit further includes a housing electrically isolated from the first terminal.

In a fifth embodiment, a method of forming an energy storage unit includes arranging first, second and third energy storage devices. Each energy storage device includes first and second electrodes. The method further includes positioning a circuit board comprising a first set of vias and a second set of vias over the first, second, and third energy storage devices. The first set of vias aligning with the first electrodes of the first, second, and third energy storage devices. The second set of vias including exposed conductors forming fusible links. The method further includes electrically connecting the circuit board to the first electrodes of the first, second, and third energy storage devices through the first set of vias.

In an example of the fifth embodiment, electrically connecting includes soldering the first electrodes to the circuit board through the first set of vias. In another example, the method further includes connecting the circuit board to a terminal.

In an additional example of the fifth embodiment, the method further includes positioning a second circuit board including a set of vias in alignment with the second electrodes of the first, second, and third energy storage devices and electrically connecting the second circuit board to the second electrodes through the set of vias of the second circuit board.

In a further example of the fifth embodiment, the method further includes placing the assembly including the first, second, and third energy storage devices and the circuit board in a housing electrically isolated from the circuit board and the first, second, and third energy storage devices.

In an example of the fifth embodiment, the exposed conductors include fusible wire. The fusible wire can have a diameter in a range of 0.01 inch to 0.1 inch.

In a sixth embodiment, an energy storage unit includes first and second terminals of opposite charge and first, second, and third energy storage devices. Each energy storage device includes first and second electrodes of opposite charge. A first fusible link has first and second sides. A first side of the fusible link is electrically connected to the first electrode of the first energy storage device and a second side of the fusible link is electrically connected to the first terminal. The first electrode of the second energy storage device is electrically connected to the second side of the first fusible link and to the first terminal. A second fusible link has first and second sides. A first side of the second fusible link is electrically connected to the first electrode of the first energy storage device and a second side of the second fusible link is electrically connected to the first terminal. The first electrode of the third energy storage device is electrically connected to the second side of the second fusible link and to the first terminal.

In an example of the sixth embodiment, the energy storage unit further includes a fourth energy storage device and a third fusible link having first and second sides. A first side of the third fusible link is electrically connected to the first electrode of the first energy storage device and a second side of the third fusible link is electrically connected to the first terminal. The first electrode of the fourth energy storage device is electrically connected to the second side of the third fusible link and to the first terminal. In another example, the energy storage unit further includes a fifth energy storage device and a fourth fusible link including first and second sides. A first side of the fourth fusible link is electrically connected to the first electrode of the first energy storage device and a second side of the fourth fusible link is electrically connected to the first terminal. The first electrode of the fifth energy storage device is electrically connected to the second side of the fourth fusible link and to the first terminal.

In a further example of the sixth embodiment, the energy storage unit further includes a third fusible link having first and second sides. A first side of the third fusible link is electrically connected to the second electrode of the first energy storage device and a second side of the third fusible link is electrically connected to the second terminal. The second electrode of the second energy storage device is electrically connected to the second side of the third fusible link and to the second terminal. In an additional example, the energy storage unit further includes a fourth fusible link having first and second sides. A first side of the fourth fusible link is electrically connected to the second electrode of the first energy storage device and a second side of the fusible link is electrically connected to the second terminal. The second electrode of the third energy storage device is electrically connected to the second side of the fourth fusible link and to the second terminal.

In an additional example of the sixth embodiment, the energy storage unit further includes a conductive housing electrically isolated from at least one of the first or second terminals. The conductive housing can be grounded.

In an example of the sixth embodiment, the energy storage unit further includes a first terminal fusible link having first and second sides. A first side of the first terminal fusible link is electrically connected to the first terminal. A second side of the first terminal fusible link is electrically connected to the first electrode of the second energy storage device and is electrically connected to the first electrode of the third energy storage device.

In another example of the sixth embodiment, the energy storage unit further includes a circuit board including a first via, a second via, and a third via, a first conductor, and a second conductor. The first and second conductors are electrically connected to the first electrode of the first energy storage device through the first via. The first conductor is exposed at the second via to form the first fusible link. The first conductor can include a fusible wire. The fusible wire can have a diameter in a range of 0.01 inch to 0.1 inch. The second conductor can include a fusible wire. The fusible wire can have a diameter in a range of 0.01 inch to 0.1 inch. The second conductor can be exposed at the third via to form the second fusible link. Alternatively, the first conductor is exposed at the third via to form the second fusible link.

In a further example of the sixth embodiment, each of the energy storage devices includes a plurality of capacitive elements electrically coupled to the first and second electrodes. For example, each capacitive element of the plurality of capacitive elements includes two conductive regions of opposite charge separated by a dielectric material.

In an additional example, of the sixth embodiment, the energy storage unit further includes a third fusible link having first and second sides. A first side of the third fusible link is electrically connected to the first electrode of the first energy storage device and a second side of the third fusible link is electrically connected to the first and second fusible links.

In another example, the energy storage unit further includes a fourth energy storage device and a third fusible link having first and second sides. A first side of the third fusible link is electrically connected to a first electrode of the fourth energy storage device and a second side of the third fusible link is electrically connected to the first electrode of the second energy storage device. The energy storage unit further includes a fourth fusible link having first and second sides. A first side of the fourth fusible link is electrically connected to the first electrode of the fourth energy storage device and a second side of the fourth fusible link is electrically connected to the first electrode of the third energy storage device.

As used herein, electrically connected means current can flow between the connected elements and allows for additional elements to be connected, for example, in series, between the connected elements. Directly electrically connected means that the connected elements are electrically connected without other intervening elements connected, for example, in series, between the connected elements.

As used herein, opposite charge means that the terminals or electrodes have a different charge. For example, if an electrode has a positive charge, an oppositely charged electrode can have a negative or neutral (ground) charge or a less positive charge. In another example, if an electrode has a negative charge, an oppositely charged electrode can have a positive or neutral (ground) charge or less negative charge. Charge is described relative to ground.

While the above-description includes embodiments of fusible links formed by fusible wire, other types of fusible links can be used.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. An energy storage unit comprising:
    first and second terminals of opposite charge;
    a circuit board;
    first, second, and third energy storage devices, each energy storage device including first and second electrodes of opposite charge;
    a first conductor including a first fusible link and a second fusible link, wherein:
        the first fusible link is electrically connected between the first electrode of the first energy storage device and the first terminal, and the first electrode of the second energy storage device is electrically connected between the first fusible link and the first terminal; and
        the second fusible link is electrically connected between the first electrode of the first energy storage device and the first terminal, and the first electrode of the third energy storage device is electrically connected between the second fusible link and the first terminal;
        the first and second fusible links are spaced apart portions of the first conductor that are exposed to air or an insulating material so that the spaced-apart portions are not heat sinked to another material;
        other portions of the first conductor at opposite ends of the first fusible link are embedded within the circuit board; and
    a second conductor including a third fusible link electrically connected between the second electrode of the first energy storage device and the second terminal, and the second electrode of the second energy storage device is electrically connected between the third fusible link and the second terminal.

2. The energy storage unit of claim 1, further comprising:
    a fourth energy storage device; and
    a third conductor including a fourth fusible link electrically connected between the first electrode of the first energy storage device and the first terminal, the first electrode of the fourth energy storage device electrically connected between the fourth fusible link and the first terminal.

3. The energy storage unit of claim 2, further comprising:
    a fifth energy storage device,
    wherein the third conductor further includes a fifth fusible link electrically connected between the first electrode of the first energy storage device and the first terminal, and the first electrode of the fifth energy storage device is electrically connected between the fifth fusible link and the first terminal.

4. The energy storage unit of claim 1, further comprising:
    the second conductor including a fourth fusible link electrically connected between the second electrode of the first energy storage device and the second terminal, and the second electrode of the third energy storage device electrically connected is between the fourth fusible link and the second terminal.

5. The energy storage unit of claim 1, further comprising a conductive housing electrically isolated from at least one of the first or second terminals.

6. The energy storage unit of claim 5, wherein the conductive housing is grounded.

7. The energy storage unit of claim 1, further comprising a first terminal fusible link electrically connected between the first terminal and the first electrode of the second energy storage device and electrically connected between the first terminal and the first electrode of the third energy storage device.

8. The energy storage unit of claim 1, further comprising:
    a third conductor; and
    a circuit board including a first via, a second via, and the first and third conductors, wherein the first and third conductors are electrically connected to the first electrode of the first energy storage device through the first via, and the first conductor is exposed to air at the second via to form the first fusible link.

9. The energy storage unit of claim 8, wherein the first conductor includes a fuse wire.

10. The energy storage unit of claim 9, wherein the fuse wire has a diameter in a range of 0.01 inch to 0.1 inch.

11. The energy storage unit of claim 8, wherein the third conductor includes a fuse wire.

12. The energy storage unit of claim 9, wherein the fuse wire has a diameter in a range of 0.01 inch to 0.1 inch.

13. The energy storage unit of claim 12, wherein the second conductor is exposed to air at a third via to form the third fusible link.

14. The energy storage unit of claim 8, wherein the third conductor is exposed to air at a third via to form the third fusible link.

15. The energy storage unit of claim 1, wherein each of the energy storage devices includes a plurality of capacitive elements electrically coupled to the first and second electrodes.

16. The energy storage unit of claim 15, wherein each capacitive element of the plurality of capacitive elements includes two conductive regions of opposite charge separated by a dielectric material.

17. The energy storage unit of claim 1, further comprising a fourth fusible link electrically connected between the first electrode of the first energy storage device and the first and second fusible links.

18. The energy storage unit of claim 1, further comprising:
a fourth energy storage device;
a fifth energy storage device;
a fourth fusible link electrically connected between a first electrode of the fourth energy storage device and the first electrode of the second energy storage device; and
a fifth fusible link electrically connected between the first electrode of the fifth energy storage device and the first electrode of the third energy storage device.

19. An energy storage unit comprising:
first and second terminals of opposite charge;
first and second circuit boards;
first, second, third, and fourth energy storage devices, each energy storage device including first and second electrodes of opposite charge and being disposed between the first and second circuit boards;
a conductive housing electrically isolated from the first terminal;
a first fuse wire including a first fusible link within a first via of the circuit board and a second fusible link within a second via of the first circuit board, wherein:
the first fusible link is electrically connected between the first electrode of the first energy storage device and the first terminal, the first electrode of the second energy storage device electrically connected between the first fusible link and the first terminal;
the second fusible link is electrically connected between the first electrode of the first energy storage device and the first terminal, the first electrode of the third energy storage device electrically connected between the second fusible link and the first terminal; and
a portion of the first fuse wire is embedded within the first circuit board;
a second fuse wire including a third fusible link electrically connected between the first electrode of the first energy storage device and the first terminal, the first electrode of the fourth energy storage device electrically connected between the third fusible link and the first terminal;
a third fuse wire including a fourth fusible link within a third via of the second circuit board and a fifth fusible link within a fourth via of the second circuit board, wherein:
the fourth fusible link is electrically connected between the second electrode of the first energy storage device and the second terminal, the second electrode of the second energy storage device electrically connected between the fourth fusible link and the second terminal;
the fifth fusible link is electrically connected between the second electrode of the first energy storage device and the second terminal, the second electrode of the third energy storage device electrically connected between the fifth fusible link and the second terminal; and
a portion of the third fuse wire is embedded within the second circuit board; and
a fourth fusible wire including a sixth fusible link electrically connected between the second electrode of the first energy storage device and the second terminal, the second electrode of the fourth energy storage device electrically connected between the sixth fusible link and the second terminal,
wherein the first fusible link, second fusible link, third fusible link, fourth fusible link, fifth fusible link, sixth fusible link, or any combination thereof is exposed to air.

20. The energy storage unit of claim 19, wherein the conductive housing is grounded.

21. A method of forming an energy storage unit, the method comprising:
arranging first, second and third energy storage devices, each energy storage device including first and second electrodes;
positioning a first circuit board over the first, second, and third energy storage devices, wherein the first circuit board comprises:
a first set of vias aligned with the first electrodes of the first, second, and third energy storage devices; and
a second set of vias including exposed conductors forming fusible links that are spaced apart from the first set of vias and the first, second, and third energy storage devices; and
electrically connecting the circuit board to the first electrodes of the first, second, and third energy storage devices through the first set of vias;
positioning a second circuit board under the first, second, and third energy storage devices, wherein the second circuit board comprises:
a third set of vias aligned with the second electrodes of the first, second, and third energy storage devices; and
a fourth set of vias including exposed conductors forming fusible links that are spaced apart from the third set of vias and the first, second, and third energy storage devices; and
electrically connecting the second circuit board to the second electrodes through the third set of vias of the second circuit board.

22. The method of claim 21, wherein electrically connecting including soldering the first electrodes to the first circuit board through the first set of vias.

23. The method of claim 21, further comprising connecting the first circuit board to a terminal.

24. The method of claim 21, further comprising placing the assembly including the first, second, and third energy storage devices and the first circuit board in a housing electrically isolated from the first circuit board and the first, second, and third energy storage devices.

25. The method of claim 21, wherein the exposed conductors include fuse wires.

26. The method of claim 25, wherein each of the fuse wires has a diameter in a range of 0.01 inch to 0.1 inch.

* * * * *

UNITED STATES PATENT AND TRADEMARK OFFICE
CERTIFICATE OF CORRECTION

| | |
|---|---|
| PATENT NO. | : 8,698,352 B2 |
| APPLICATION NO. | : 12/860519 |
| DATED | : April 15, 2014 |
| INVENTOR(S) | : Richard D. Weir |

It is certified that error appears in the above-identified patent and that said Letters Patent is hereby corrected as shown below:

In the Claims

Column 15, Line 41, Claim 19: please change "via of the circuit board" to --via of the first circuit board--.

Column 16, Line 12, Claim 19: please change "a fourth fusible wire" to --a fourth fuse wire--.

Signed and Sealed this
Sixteenth Day of September, 2014

Michelle K. Lee
*Deputy Director of the United States Patent and Trademark Office*